United States Patent [19]

Tanny

[11] 4,338,194

[45] Jul. 6, 1982

[54] METHOD OF PRODUCING SOLUTE-REJECTING DYNAMIC MEMBRANE FILTERS AND FILTERS INCLUDING SUCH MEMBRANES

[75] Inventor: Gerald Tanny, Ann Arbor, Mich.

[73] Assignee: Yeda Research & Development Company Ltd., Rehovot, Israel

[21] Appl. No.: 912,549

[22] Filed: Jun. 5, 1978

[51] Int. Cl.³ .............................................. B01D 31/00
[52] U.S. Cl. ................................ 210/490; 210/500.2; 427/245
[58] Field of Search ............... 210/238, 23 H, 75, 193, 210/321 R, 500 M, 440, 491, 433 M; 428/408, 538, 472, 398; 427/244–246

[56] References Cited

U.S. PATENT DOCUMENTS

| | | | |
|---|---|---|---|
| 3,556,305 | 1/1971 | Shorr | 210/490 |
| 3,743,595 | 7/1977 | Johnson | 210/23 |
| 3,923,654 | 12/1975 | O'Hern et al. | 210/500 M X |
| 4,060,488 | 11/1977 | Hoover et al. | 210/500 M X |

*Primary Examiner*—Frank A. Spear, Jr.
*Attorney, Agent, or Firm*—Benjamin J. Barish

[57] ABSTRACT

Methods of producing solute-rejecting dynamic membrane filters are described comprising depositing a bed of fumed silica particles on a porous substrate having a pore size of 0.025–3 microns, the silica particles being substantially spherical and uniform and having a nominal particle diameter of 20–80 Å.

24 Claims, No Drawings

METHOD OF PRODUCING SOLUTE-REJECTING DYNAMIC MEMBRANE FILTERS AND FILTERS INCLUDING SUCH MEMBRANES

BACKGROUND OF THE INVENTION

The present invention relates to methods of producing solute-rejecting dynamic membrane filters, and also to filters including such membranes.

Solute-rejecting dynamic membrane filters are well known, for example as described in U.S. Pat. No. 3,577,339 of May 4, 1971. Such known filters include a porous substrate (e.g., porous metal, ceramic, or carbon) having a relatively large pore size (e.g., 5 to 50 microns in diameter) on which has been deposited a bed of smaller particles (e.g. in the range of 0.01–100 microns in diameter) of an inert material, for example diatomaceous earth, perlite, asbestos fibres, cellulous fibres, dried silica gel, and carbon. The thin bed of particles functions as a finely pored body and remains uniformly distributed even when deposited in the presence of a cross-flow velocity parallel to the surface of the membrane. The thickness of the bed is a function of the cross-flow velocity, and therefore, it is often useful to deposit the bed under turbulent flow conditions. The filters are easily re-established by depositing a new bed of the particles on the porous substrate.

In order to make the known dynamic membrane filters solute-rejecting, it is generally necessary to include a solute-rejecting additive, for example, a neutral organic polymer, polyelectrolyte, organic or inorganic ion exchanger, or hydrous metal oxide, as described in column 3, lines 12–23 of the above-cited patent. Moreover, it is generally difficult, in the known procedures, to tailor the produced dynamic membrane to have a preselected molecular weight cut-off characteristic.

OBJECTS AND SUMMARY OF THE INVENTION

An object of the present invention is to provide a novel method of producing a solute-rejecting dynamic membrane filter, and also to provide a filter including such membrane, which method and filter have advantages in the above respects.

According to one aspect of the present invention, there is provided a method of producing a solute-rejecting dynamic membrane filter, comprising depositing a bed of silica particles on a porous substrate having a pore size of 0.025–3 microns, the silica particles being substantially spherical and uniform and having a nominal particle diameter of 20–80 Å.

According to another aspect of the present invention, there is also provided a solute-rejecting dynamic membrane filter, comprising: a porous substrate having a pore size of 0.025–3 microns, and a bed of silica particles deposited thereon, said silica particles being substantially spherical and uniform, and having a nominal particle diameter of 20–80 Å.

It has been found that when the dynamic membrane filter is formed with a porous substrate of the above range, and particularly including silica particles in the above range of sizes (both of which ranges are below those specified in the above-cited U.S. Patent), a solute-rejecting membrane is produced without the need for adding a solute-rejecting additive as described in the above-cited U.S. Patent (e.g. Column 3, lines 12–23). Moreover, it has been found that the molecular weight cut-off characteristic of the dynamic filter can be preselected over a wide range by merely selecting the pressure applied during the deposition of the silica particles.

The pressure at which the deposition is carried out may generally vary from 0.5 to 70 atmospheres, depending on the selectivity desired, the higher pressures producing a lower molecular weight cut-off characteristic, and the lower pressures producing a higher molecular weight cut-off characteristic. By utilizing the smaller particles (below 40 Å) together with those of larger size (between 70–80 Å), it is possible to obtain greater solute selectivity at a lower operating pressure. This may be carried out by first depositing a layer of particles of a size range of 70–80 Å followed by a second deposition of particles of size range of less than 40 Å. The pH should be in the range 2–9.5, with the preferred pH=4, while the ionic strength of the solution should be less than 0.3 M, and always below that required to cause coagulation of the silica particles.

It has also been found that by including a polyelectrolyte with the silica particles in the liquid applied to the substrate, an increase is produced in the rejection of small negatively charged solute present in the liquid being filtered. This makes the filter particularly useful in removing the charged surfactants in oil emulsions. It has also been found that by using a polyelectrolyte and then further treating the dynamic membrane with another water soluble polymer (e.g. a solution of polyvinyl alcohol), the product flux is maintained relatively constant over a substantial period of time, besides increasing the selectivity of the membrane in salt rejection.

The foregoing advantages of the present invention will be better illustrated by the specific examples set forth below.

DESCRIPTION OF PREFERRED EMBODIMENTS

Generally, the formation, from silica of a dynamic membrane having solute rejecting properties is carried out in the following manner: A very fine dispersion of silica particles, whose nominal particle diameter is between 20–80 Å and whose concentration is between 5–5000 ppm, is prepared in ion-exchanged, filtered water. This dispersion may be prepared either by ultrasonication of fumed silica particles, or by treatment of a solution of sodium silicate to a pH between 2–9.5, and allowing the particles to grow to a well defined size, as known in the prior art. This solution is then filtered through a filter medium substrate possessing small uniform pores in such a way as to lead to the deposit of a thin uniform bed of particles. The pores of the substrate may be from 0.025 to 3 microns, with the preferred range being between 0.1–1 microns, although this may depend on the type of filter medium used.

EXAMPLE 1

A dispersion of 500 ppm fumed silica, particle size 70 Å (Cab-O-Sil EH-5 Cabot Corp.) was made up in ion-exchanged, filtered water at pH=7 by ultrasonication for 90 min. in a 50 W "Bransonic" ultrasonic bath. The solution was filtered for 30 minutes at a cross flow rate of 0.5 l/min. and a pressure of 25 psi. through a tubular Selas ceramic support (Flotronics Corp.) containing pores 0.27 microns in diameter. The dynamic membrane formed displayed 85% rejection of a $2 \times 10^6$ g/$M$ molecular weight (0.1%) dextran solution, but only 24% rejection for a dextran fraction of $5 \times 10^5$ g/M and 6.5% rejection for a dextran fraction of $7 \times 10^4$ g/M molecular weight. The solute rejection of a $10^{-3}$ N Na$_2$SO$_4$ salt solution was found to be 40%, which demonstrated that the membrane also rejected the small mol.wt. ionic solutes. The filtration of a 3% commercial cooling oil emulsion (Trucut EP/CW) gave 90% rejection of total organic carbon (TOC). Flux decline was also tested with the cooling oil at a pressure of 30 PSI, the initial flux was 12 cm/hr, which flux decreased to 8 cm/hr over a period of 80 hrs. For a second commercial cooling oil (Chimcool) which forms transparent microemulsions, the TOC rejection was 67%, and the flux was 10–12 cm/hr.

It will thus be seen that the membrane made as described above in Example 1 has solute-rejecting properties even without the addition of a solute-rejecting additive such as described in the above-cited U.S. Patent.

To show the criticality of the above range of particle diameters, the same procedure as described above in Example 1 was carried out but with silica particles of 120 Å (Cab-O-Sil M5). The filter produced exhibited zero rejection of $2 \times 10^6$ g/M Mol.Wt. (0.1% dextran solution), as compared to 85% when silica particles of a size of 70 Å were used, as described in Example 1.

As noted above, the molecular weight cut-off characteristic of the filter produced can be varied by merely selecting the formation pressure of the silica particle bed, a filter having a higher solute molecular weight cut-off being produced by using a formation pressure of the order of 1–5 atmospheres, and a filter having a lower solute molecular weight cut-off being produced by using a formation pressure of the order of 5–50 atmospheres. This may be illustrated by the following example:

EXAMPLE 2

Silica dispersion and filtration conditions were identical to Example 1 except that formation pressure was raised to 120 psi. Rejection of a 0.1% solution of a $5 \times 10^5$ g/M dextran fraction was 100%, while rejection of $1.1 \times 10^5$ g/M fraction was 92% and that of $7 \times 10^4$ g/M fraction was 65%

As also noted above, greater solute selectivity can be obtained at a lower operating pressure by first depositing larger silica particles (e.g., 70–80 Å) and then smaller silica particles (e.g., 20–40 Å). This is illustrated by the following example.

EXAMPLE 3

A dynamic membrane was simultaneously prepared from a solution as in Example 1 at a feed cross-flow rate of 1 l/min and a pressure of 15 psi, on a 0.45μ Acropor flat sheet porous support (Gelman Inst. Corp.) and a 0.27μ Selas ceramic tube. This was followed by a second filtration, at the same pressure and cross-flow rate, of a dispersion of 250 ppm silica prepared by passing 1 cc of a 25% aqueous solution of sodium silicate down an ion-exchange column and diluting to 1 l, the final solution having a pH of 8.5, adjusted to pH=4 with HCl. When tested with $10^{-3}$N Na$_2$SO$_4$ at a pressure of 15 psi and a circulation flow rate of 1–3 l/min, the membrane formed on both porous supports showed 85% rejection of salt, as measured by permeate solution conductance and a permeate flux of 13 cm/hr (as conpared to 40% in Example 1). The same membranes displayed 93% rejection of Total Organic Carbon (TOC) of a 3% commercial cooling oil Emulsion (Trucut EP/CW) with the same permeate flux. For the micro-emulsion of a second commercial cooling oil (Chimcool), the dynamic membranes displayed TOC rejection of 80% (as compared to 67% in Example 1) with a permeate flux between 9–12 cm/hr.

The above example also illustrates the use of silica particles produced by precipitation from a sodium silicate solution, the particle size being about 30–40 Å.

As further noted above, the rejection of small negatively charged solutes present in the medium can be increased by including a polyelectrolyte in the silica particle dispersion producing the silica bed. This makes the filter particularly useful in removing the charged surfactants in oil emulsions. This feature is illustrated by the following example:

EXAMPLE 4

As Example 1, except that the concentration of fumed silica was only 250 ppm; and 1000 ppm of a block copolymer polyelectrolyte was added to the dispersion, which was adjusted to pH=2. The block copolymer comprised polyacrylic acid ($10^4$ molecular weight) covalently bonded to polystyrenesulphonic acid ($4 \times 50^4$ molecular weight) convalently bonded to a second block of polyacrylic acid ($10^4$ molecular weight). When a 3% emulsion of a commercial cooling oil (Trucut EP/CW) was filtered, the flux obtained was 10 cm/hr, and the rejection of Total Organic Carbon (TOC) was 99% (as compared to 90% in Example 1).

The selectivity of the membrane can be further increased, and moreover its product flux can be maintained substantially constant over a long period of time, by an additional water-soluble polymer treatment of the membrane. This is illustrated by the following example.

EXAMPLE 5

As in Example 1, except that the silica concentration was 250 ppm, and 500 ppm of polyacrylic acid (molecular weight $1–3 \times 10^5$) adjusted to pH=2. The pressure of formation was 26 atmospheres. After formation of the dynamic membrane, a further treatment was given with a solution of 5 ppm of polyvinyl-alcohol (Dupont grade 52-22, molecular weight 150,000, degree of hydrolysis=87%) at a pH=4. The rejection of a solution of $10^{-3}$N Na$_2$SO$_4$ was 100% (as compared to the case of Example 1 in which it was only 40%). For a membrane of similar composition formed at 7 atmospheres, the filtration of the 3% commercial cooling oil of Example 3 gave 95% rejection of TOC (as compared to 90% in Example 1), and maintained its initial flux of 15 cm/hr for 80 hours with no significant decline.

While the invention has been described with respect to several examples, it will be appreciated that many variations, modifications and other applications of the invention may be made.

What is claimed is:

1. A method of producing a solute-rejecting dynamic membrane filter, comprising depositing a bed of silica particles on a porous substrate having a pore size of 0.025–3 microns, the silica particles being substantially spherical and uniform and having a nominal particle diameter of 20–80 Å.

2. The method of claim 1, wherein said silica particles include fumed silica.

3. The method of claim 2, wherein said fumed silica particles are produced by vapour phase hydrolysis of silicone tetrachloride.

4. The method of claim 1, wherein said silica particles include the precipitant from a solution of sodium silicate.

5. The method according to claim 1, wherein the bed of silica particles is deposited by dispersing the particles in a liquid and applying said liquid to the porous substrate at a preselected pressure of 0.5–70 atmospheres, said pressure having been preselected according to the desired solute molecular weight cut-off for the filter.

6. The method according to claim 5, wherein the silica particle dispersion is applied to the substrate at a pressure in the order of 1–5 atmospheres to produce a relatively high solute molecular weight cut-off.

7. The method according to claim 5, wherein the silica particle dispersion is applied to the substrate at a pressure in the order of 5–50 atmospheres to produce a relatively low solute molecular weight cut-off.

8. The method according to claim 1, wherein the liquid in which the silica particles are dispersed is water.

9. The method according to claim 5, wherein the bed of silica particles is deposited in two steps, the first step being to apply to the porous substrate a liquid including silica particles having a nominal particle diameter of 70–80 Å, the second step being to apply to the so-treated porous substrate a liquid including silica particles having a nominal particle diameter of 30–40 Å.

10. The method of claim 9, wherein, in the first step the silica particles are fumed silica, and in the second step the silica particles are produced by precipitation from a solution of sodium silicate.

11. The method according to claim 5, wherein a polyelectrolyte is included with the silica particles in the liquid applied to the substrate.

12. The method according to claim 11, wherein said polyelectrolyte is a block copolymer comprising polyacrylic acid covalently bonded to polystyrene sulphonic acid covalently bonded to a second block of polyacrylic acid.

13. The method according to claim 11, wherein said polyelectrolyte is polyacrylic acid.

14. The method according to claim 11, including the further step of treating the dynamic membrane with a solution of polyvinyl alcohol.

15. A solute-rejecting dynamic membrane filter, comprising: a porous substrate having a pore size of 0.025–3 microns, and a bed of silica particles deposited thereon, said silica particles being substantially spherical and uniform, and having a nominal particle diameter of 20–80 Å.

16. A filter according to claim 15, wherein said silica particles include fumed silica.

17. A filter according to claim 15, wherein said silica particles include the precipitant from a solution of sodium silicate.

18. A filter according to claim 15, wherein the bed of silica particles includes a first deposition of silica particles having a nominal particle diameter of 70–80 Å, and a second deposition of silica particles having a nominal particle diameter of 30–40 Å.

19. A filter according to claim 18, wherein the silica particles of the first deposition are fumed silica, and the silica particles in the second deposition are the precipitant from a solution of sodium silicate.

20. The filter according to claim 15, wherein a polyelectrolyte is included in the bed of silica particles.

21. The filter according to claim 20, wherein said polyelectrolyte is a block copolymer comprising polyacrylic acid covalently bonded to polystyrene sulphonic acid covalently bonded to a second block of polyacrylic acid.

22. The filter according to claim 20, wherein said polyelectrolyte is polyacrylic acid.

23. The filter according to claim 20, wherein the dynamic membrane has been treated with a solution of polyvinyl alcohol.

24. The filter according to claim 15, wherein the substrate has a pore size of 0.1–1 micron.

* * * * *